United States Patent
Chang et al.

(10) Patent No.: US 7,596,181 B2
(45) Date of Patent: Sep. 29, 2009

(54) APPARATUS AND METHOD FOR FREQUENCY SYNCHRONIZATION IN OFDM SYSTEM

(75) Inventors: Jin-Weon Chang, Suwon-si (KR);
Hwan-Joon Kwon, Suwon-si (KR);
Dong-Hee Kim, Yongin-si (KR);
Youn-Sun Kim, Seongnam-si (KR);
Jin-Kyu Han, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 622 days.

(21) Appl. No.: 11/227,325

(22) Filed: Sep. 16, 2005

(65) Prior Publication Data
US 2006/0062317 A1     Mar. 23, 2006

(30) Foreign Application Priority Data
Sep. 18, 2004    (KR)    ............. 10-2004-0074890

(51) Int. Cl.
*H04K 1/10*    (2006.01)
(52) U.S. Cl. .................. 375/260; 375/267; 375/316; 370/203; 370/210; 370/348; 370/344; 455/296
(58) Field of Classification Search ............. 370/344, 370/203, 210, 208, 503, 348, 354, 267; 708/404; 455/296; 375/260, 316
See application file for complete search history.

(56) References Cited

U.S. PATENT DOCUMENTS

| | | | |
|---|---|---|---|
| 6,009,073 A | 12/1999 | Kaneko | |
| 6,314,083 B1 | 11/2001 | Kishimoto et al. | |
| 6,459,745 B1 | 10/2002 | Moose et al. | |
| 6,618,452 B1 | 9/2003 | Huber et al. | |
| 6,678,339 B1 | 1/2004 | Lashkarian | |
| 6,754,170 B1 * | 6/2004 | Ward | 370/208 |
| 2003/0026295 A1 * | 2/2003 | Baum et al. | 370/503 |
| 2004/0081131 A1 * | 4/2004 | Walton et al. | 370/344 |
| 2005/0094550 A1 * | 5/2005 | Huh et al. | 370/203 |
| 2005/0099939 A1 * | 5/2005 | Huh et al. | 370/210 |
| 2006/0039275 A1 * | 2/2006 | Walton et al. | 370/208 |
| 2006/0224651 A1 * | 10/2006 | Madhavapeddi et al. | 708/404 |

(Continued)

FOREIGN PATENT DOCUMENTS

JP    10303849    11/1998

(Continued)

*Primary Examiner*—Sudhanshu C Pathak
(74) *Attorney, Agent, or Firm*—Roylance, Abrams, Berdo & Goodman, LLP

(57) ABSTRACT

A method and apparatus are provided for frequency synchronization in an Orthogonal Frequency Division Multiplexing (OFDM) system, wherein the method includes the steps of transmitting OFDM symbols in such a manner that a data symbol size of a particular OFDM symbol in each frame is set to be smaller than a data symbol size of a typical OFDM symbol within the frame, receiving the OFDM symbols and calculating respectively, correlation coefficients of the particular OFDM symbol based on both a time interval of corresponding data symbols and a time interval of data symbols of the typical OFDM symbol, taking respectively phases of corresponding correlation coefficient calculated from the particular OFDM symbol and estimating a decimal part of a frequency offset, and determining an integer part of the frequency offset corresponding to the decimal part of the frequency offset, thereby estimating an entire frequency offset and acquiring the frequency synchronization.

17 Claims, 12 Drawing Sheets

U.S. PATENT DOCUMENTS

2006/0245349 A1 * 11/2006 Vrcelj et al. .................. 370/210
2006/0258316 A1 * 11/2006 Lei et al. ..................... 455/296

FOREIGN PATENT DOCUMENTS

| JP | 2000324080 | 11/2000 |
|----|------------|---------|
| JP | 2001036495 | 2/2001 |
| JP | 2002518880 | 6/2002 |
| JP | 2003018116 | 1/2003 |
| JP | 2003318857 | 11/2003 |
| JP | 2004134883 | 4/2004 |
| JP | 2004172721 | 6/2004 |
| JP | 2005150850 | 6/2005 |
| RU | 2 105 423 C1 | 2/1998 |
| RU | 2 235 429 C1 | 8/2004 |

* cited by examiner

APPARATUS AND METHOD FOR FREQUENCY SYNCHRONIZATION IN OFDM SYSTEM

CROSS-REFERENCE TO RELATED APPLICATIONS

This application claims the benefit under 35 U.S.C. §119 (a) of Korean Patent Application No. 10-2004-0074890 entitled "Apparatus And Method For Initial Frequency Synchronization In OFDM System" filed in the Korean Intellectual Property Office on Sep. 18, 2004, the entire disclosure of which is hereby incorporated by reference.

BACKGROUND OF THE INVENTION

1. Field of the Invention

The present invention relates to a method and an apparatus for data transmission in an Orthogonal Frequency Division Multiplexing (OFDM) system. More particularly, the present invention relates to a method and an apparatus for initial frequency synchronization for data transmission by using OFDM symbols.

2. Description of the Related Art

The OFDM scheme is a fourth generation (4G) modulation scheme which is expected to be adopted as a standard for digital televisions in European countries, Japan and Australia. The OFDM scheme was initially recommended for a Local Area Network (LAN) technology and is now being developed to provide mobility to an OFDM-based wireless LAN technology for a cellular system for wireless Internet service.

The band spread technology of the OFDM scheme distributes data to a plurality of sub-carriers at the exact same frequency interval. This frequency interval provides "orthogonality" within a technology preventing a demodulator from referring to frequencies other than its own frequency. Further, the OFDM scheme is a kind of multi-carrier modulation scheme and shows an excellent performance in a multi-path mobile reception environment. Therefore, the OFDM scheme is now attracting attention as a modulation scheme that is well suited for ground wave digital televisions and digital voice broadcasting. Although the OFDM scheme has been researched and developed mainly in the field of communication, it is now being actively researched and developed in the field of broadcasting, especially in the case of broadcasting after the OFDM scheme is employed as a modulation scheme of a Digital Audio Broadcast (DAB) system proposed by the European Broadcasting Union (EBU).

FIG. 1 is a block diagram illustrating the structure of a transmitter and a receiver in a physical layer of a typical OFDM system.

Referring to FIG. 1, an input bit stream to be transmitted is transferred through an encoder 111 to a serial/parallel converter 112. Then, the serial/parallel converter 112 collects N number of symbols and transfers the N symbols to an Inverse Fast Fourier Transform (IFFT) converter 113 which converts the symbols from symbols of the frequency domain into time domain symbols. Thereafter, a parallel/serial converter 114 converts the time domain symbols into serial symbols. In the above process, the N collected symbols are referred to as 'OFDM' symbols. Then, a Cyclic Prefix (CP) inserter 115 adds a CP to each of the serial time domain symbols obtained by the parallel/serial converter 114 in order to remove the influence of the multi-path channels. Then, the CP-added symbols in a digital domain are converted to an analog signal by a digital/analog converter 116, and the converted analog signal is then transmitted through a channel 120 to a receiver side.

When the transmitted signal is received by the receiver 130 through the channel 120, an analog/digital converter 131 converts the received analog signal into a digital signal, and a CP remover 132 removes CP from the OFDM symbol contaminated due to the multi-path. The CP-removed signal is converted into a frequency domain signal by a Fast Fourier Transform (FFT) converter 134 after passing through a serial/parallel converter 133. The converted frequency domain signal passes through an equalizer 135 for eliminating channel interference, a parallel/serial converter 136 and a decoder 137, and is then output as an output bit stream at the receiver terminal.

FIG. 2 is a graph showing data symbols transmitted in a typical OFDM system, which are illustrated according to frequency and time.

In an OFDM system as described above with reference to FIG. 1, N number of data symbols within one OFDM symbol are transmitted by N number of sub-carriers. The N data symbols carried by the N sub-carriers constitute one OFDM symbol 201, and M number of OFDM symbols constitute one frame 202. The start symbol of the frame 202 usually includes a pilot symbol for frequency synchronization and channel estimation, by which a preamble, control information and so forth, is transmitted.

The OFDM system has an excellent performance for a mobile reception environment and a good frequency band use efficiency. However, in the OFDM system, the sub-carriers orthogonal to each other are compactly disposed with small intervals. Therefore, the OFDM system is relatively weak with regard to frequency offset in comparison with the single sub-carrier system.

Hereinafter, an example of the orthogonality between sub-carriers in the OFDM system will be described with reference to FIG. 3.

Referring to the graph in FIG. 3, three sub-carriers a shown. It is noted that data is transmitted by using frequency $f_{n-1}$ 301, frequency $f_n$ 302 and frequency $f_{n+1}$ 303 adjacent to each other. The data transmitted through each of the frequencies 301 to 303 has a sinusoidal waveform, and each of the first frequency signal 304, second frequency signal 305 and third frequency signal 306 is exactly located at the frequency of a corresponding sub-carrier. Therefore, the three signals give no interference to each other.

FIG. 4 is a graph showing interference between sub-carriers when there are frequency offsets in a typical OFDM system.

If each sub-carrier has a frequency offset of $\Delta f$ 401 from an exact frequency of the sub-carrier, the receiver fails to catch the exact frequency location of the sub-carrier and instead takes a data sample at a location deviated $\Delta f$ 401 from the exact location. Therefore, interference occurs between the three sub-carriers shown in FIG. 4, including the first sub-carrier signal 402, the second sub-carrier signal 403 and the third sub-carrier signal 404. For example, a signal sample 405 having a frequency offset of $\Delta f$ 401 from the second sub-carrier signal 403 is subject to interference by the first sub-carrier signal 407 and the third sub-carrier signal 406 at a corresponding frequency location. As described above, the OFDM system has orthogonality between sub-carriers, which reduces the interval between the sub-carriers and causes the sub-carriers to be compactly arranged. Therefore, the OFDM system is largely influenced by interference due to the frequency offset.

According to a conventional initial frequency synchronization scheme in order to compensate for frequency offsets in the OFDM system as described above, the initial frequency synchronization is performed by using two pilot OFDM symbols. The conventional initial frequency synchronization includes two steps, that is, a first step of fine frequency synchronization (that is, compensation for frequency offsets within a band twice as wide as the sub-carrier band) and a second step of frequency ambiguity resolution for a part corresponding to a multiple of the band that is twice as wide as the sub-carrier band.

FIG. 5 illustrates an example of the format of pilot OFDM symbols according to the conventional initial frequency synchronization method in an OFDM system.

The first pilot OFDM symbol 501, which is a symbol for the fine frequency synchronization (hereinafter, referred to as "the first frequency synchronization") in the first step for the frequency synchronization, has values other than zero for the sub-carriers in an even number order and '0' for the sub-carriers in an odd number order. The first pilot OFDM symbol 501 is identical to the repetition of pilot symbols each having a half symbol length in the time domain. The process for the first frequency synchronization corresponds to a process of obtaining the decimal part of the frequency offset.

The second pilot OFDM symbol 502 is a symbol for the frequency ambiguity resolution in the second step for the frequency synchronization, which will be referred to as the second frequency synchronization process. The second pilot OFDM symbol 502 has values for all sub-carriers. The second frequency synchronization process corresponds to a process of obtaining the integer part of the frequency offset.

In other words, the frequency offset includes a decimal part expressed as being smaller than twice the sub-carrier band, and an integer part expressed as being a multiple of twice the sub-carrier band, which can be expressed by equation (1) below.

$$\Delta f = \phi/(\pi T) + 2g/T \quad (1)$$

In equation (1), $\Delta f$ denotes the entire frequency offset, $\phi$ denotes the decimal part of the frequency offset and T denotes the symbol length. Further, g denotes the integer part of the frequency offset corresponding to an integer being a multiple of twice the sub-carrier band.

If one data symbol is expressed by using an N point Fast Fourier Transform (FFT), a received symbol signal w(t) having a frequency offset can be expressed by equation (2) below.

$$w(t) = \sum_{-N}^{N} H_k C_k \exp(j2\pi(f_k + \Delta f)t) \quad (2)$$

$$w(t) = \exp(j2\pi \Delta f t) \sum_{-N}^{N} H_k C_k \exp(j2\pi f_k t)$$

If one received data symbol located at the first half OFDM symbol of the first pilot symbol is set as $w(t_0)$, and another received data symbol located at the second half OFDM symbol corresponding to the same location of the first half OFDM symbol is set as $w(t_0+T/2)$, a relation as expressed by equation (3) below is established.

$$w^*(t_0)w(t_0 + T/2) = \quad (3)$$

-continued
$$\exp(j\pi \Delta f T) \sum_{k=-N}^{N} \sum_{l=-N}^{N} H_k^* C_k^* H_l C_l \exp(j2\pi(f_k - f_l)t_0 + j\pi f_l T)$$

If the phase of the correlation value of the repeated half OFDM symbol length from equation (3), a relation defined by equation (4) below can be established between the decimal part $\phi$ of the frequency offset and the entire frequency offset $\Delta f$.

$$\phi = \pi \Delta f T \quad (4)$$

That is, it is possible to estimate the decimal part of the frequency offset through phase estimation by taking the correlation coefficient of the repeated part of the first pilot symbol.

The conventional frequency offset estimation method teaches the use of the function as defined by equation (5) below in order to enhance the precision in the estimation.

$$P(d) = \sum_{m=0}^{L-1} w_{d+m}^* w_{d+m+L} \quad (5)$$

If it is possible to guarantee that the absolute value of the initial frequency offset is within a range smaller than the sub-carrier band, the entire frequency offset can be estimated as equation (6) below.

$$\Delta f = \hat{\phi}/(\pi T) \quad (6)$$

However, it is actually not always possible to guarantee that the absolute value of the initial frequency offset is within a range smaller than the sub-carrier band, and there exists an ambiguity corresponding to a multiple of twice the sub-carrier band.

Therefore, in order to finally determine the frequency offset, it is necessary to resolve the ambiguity of the integer part of the frequency offset corresponding to the integer g in equation (1) in advance, for which the second pilot symbol is used. First, an estimation for the part corresponding to the decimal part of the frequency offset in the first frequency synchronization process is performed. Then, only the part corresponding to 2g/T remains in the frequency offset.

The frequency conversion values of the first and second pilot symbols are set as $X_{1,k}$ and $X_{2,k}$, respectively, and the second pilot symbol is determined such that the differentially modulated values of the frequency conversion value of the first pilot symbol and the frequency conversion value of the even number-th sub-carriers of the second pilot symbol have a particular pattern. Further, according the conventional method, in order to determine g which is the integer part of the frequency offset, correlation coefficients of a predetermined pattern and differences between the first and second pilot symbols for possible g values are obtained. Then, a g value having the largest correlation value from among the obtained correlation values is determined as the final value. Through the above process, the frequency offset is estimated.

FIG. 6 is a block diagram illustrating a structure of a transmitter and a receiver for initial frequency synchronization in a physical layer of a conventional OFDM system.

In the transmitter 610 of FIG. 6, for transmission through the first and second OFDM symbols of each frame as described above, pilot bits pass through the serial/parallel converter 612, are converted into symbols of the time domain, and are then converted into a serial pilot bits. The Cyclic Prefix (CP) inserter 615 inserts CPs to the converted pilot bits, which are then converted from the digital signal to an analog signal by the digital/analog converter 616. Then, the converted analog signal is transmitted through the channel 620 to the receiver 630.

The signal received through the channel 620 is converted again from the analog signal to a digital signal by the analog/digital converter 631 and the converted digital signal is then transferred to the correlator 638. Then, in order to acquire the first frequency synchronization, the correlator 638 finds the repeated pattern of the first pilot OFDM symbol of the received signal and revises the decimal part of the frequency offset. After the decimal part of the frequency offset is revised, the CP remover 632 removes CPs from the received signal, the serial/parallel converter 633 converts the signal into a parallel signal, and then the FFT converter 634 converts the signal into a signal of the frequency domain. Then, in order to acquire the second frequency synchronization, the ambiguity resolution unit 640 checks the correlation value between the differential values of the first and second pilot symbols in the frequency domain and thereby solves the ambiguity of the frequency offset, that is, revises the integer part of the frequency offset. Then, the initial frequency synchronization is acquired as a result.

The conventional frequency synchronization method as described above is known as a method that is capable of obtaining an exact initial frequency offset. However, in the OFDM based wireless system, the conventional method uses two OFDM symbols within one frame for pilot transmission in order to revise the initial offset, thereby causing an excessively large overhead. In order to solve this problem, a method has been developed that is capable of acquiring the initial frequency offset while using only one pilot OFDM symbol for revising the initial frequency offset.

According to this method which uses only one pilot OFDM symbol, the second pilot OFDM symbol as shown in FIG. 5 is not transmitted, and only the first pilot OFDM symbol is transmitted, so that the symbol corresponding to the second pilot OFDM symbol can be used in transmitting data and thus can reduce the overhead. In the method for initial frequency synchronization by using only one pilot OFDM symbol, it is also necessary to perform both the first frequency synchronization step for finding the decimal part of the frequency offset, and the second frequency synchronization step for resolving the ambiguity of the multiple of the sub-carrier band by finding the integer part of the frequency offset. That is, the same process as that using equation (6) is also used in the method for initial frequency synchronization by using only one pilot OFDM symbol.

However, although the method using only one pilot OFDM symbol can reduce the overhead of the system in comparison with the method using two pilot OFDM symbols, the method using only one pilot OFDM symbol is based on an assumption that the channel does not change for a predetermined number of sub-carriers in resolving the ambiguity for determining the integer part of the frequency offset. Therefore, the method using only one pilot OFDM symbol has a degraded performance in acquiring the initial frequency synchronization for a channel environment having a selectivity in the frequency domain.

Accordingly, a need exists for a system and method that is capable of substantially guaranteeing an improved performance for initial frequency synchronization while reducing the overhead of the system.

SUMMARY OF THE INVENTION

Accordingly, the present invention has been made to solve the above-mentioned and other problems occurring in the prior art, and an object of the present invention is to provide a method and an apparatus for initial frequency synchronization which can reduce the overhead of the system in the process for initial frequency synchronization of an OFDM system.

It is another object of the present invention to provide a method and an apparatus which can acquire initial frequency synchronization without transmitting a pilot OFDM symbol in an OFDM system.

It is another object of the present invention to provide a method and an apparatus which can acquire initial frequency synchronization by using a cyclic prefix in an OFDM system.

It is another object of the present invention to provide a method and an apparatus which can acquire initial frequency synchronization in the time domain without transmitting a preamble in an OFDM system.

It is another object of the present invention to provide a method and an apparatus which can acquire initial frequency synchronization by adjusting the data size of a data OFDM symbol in an OFDM system.

In order to accomplish this object, a method is provided for frequency synchronization in an Orthogonal Frequency Division Multiplexing (OFDM) system, the method comprising the steps of: transmitting OFDM symbols such that a data symbol size of a particular OFDM symbol is set to be smaller than a data symbol size of typical OFDM symbols within a frame; receiving the particular OFDM symbol and calculating respectively correlation coefficients of the particular OFDM symbol based on both a time interval of corresponding data symbols and a time interval of data symbols of the typical OFDM symbol; taking respectively phases of corresponding correlation coefficients calculated from the particular OFDM symbol and estimating a decimal part of a frequency offset; and determining an integer part of the frequency offset corresponding to the decimal part of the frequency offset for estimating a substantially entire frequency offset and acquiring the frequency synchronization.

In accordance with another aspect of the present invention, a method is provided for transmitting Orthogonal Frequency Division Multiplexing (OFDM) symbols by a transmitter for frequency synchronization in an OFDM system, the method comprising the steps of performing Inverse Fast Fourier Transform (IFFT) on the OFDM symbols after setting a data symbol size of a particular OFDM symbol in each frame to be smaller than a data symbol size of a typical OFDM symbol within the frame, and inserting cyclic prefixes into data symbols of the particular OFDM symbol and then transmitting the OFDM symbols.

In accordance with another aspect of the present invention, a method is provided for receiving Orthogonal Frequency Division Multiplexing (OFDM) symbols by a receiver for frequency synchronization in an OFDM system, the method comprising the steps of: receiving a particular OFDM symbol having a data symbol size smaller than a data symbol size of typical OFDM symbols and calculating respectively correlation coefficients of the particular OFDM symbol based on both a time interval of the corresponding data symbols and a time interval of the typical OFDM symbols; taking respectively phases of corresponding correlation coefficients calculated from the particular OFDM symbol and estimating a decimal part of a frequency offset; and determining an integer part of the frequency offset corresponding to the decimal part of the frequency offset for estimating a substantially entire frequency offset and acquiring the frequency synchronization.

In accordance with another aspect of the present invention, an Orthogonal Frequency Division Multiplexing (OFDM) system is provided for frequency synchronization for communication, the system comprising: a transmitter for transmitting OFDM symbols such that a data symbol size of a particular OFDM symbol is set to be smaller than a data symbol size of typical OFDM symbols within a frame; and a receiver for receiving the particular OFDM symbol and calculating respectively correlation coefficients of the particular OFDM symbol both a time interval of corresponding data symbols and a time interval of data symbols of the typical OFDM symbol, taking respectively phases of corresponding correlation coefficients calculated from the particular OFDM symbol and estimating a decimal part of a frequency offset, and determining an integer part of the frequency offset corresponding to the decimal part of the frequency offset for estimating a substantially entire frequency offset and acquiring the frequency synchronization.

In accordance with another aspect of the present invention, an apparatus is provided for transmitting Orthogonal Frequency Division Multiplexing (OFDM) symbols for frequency synchronization in an OFDM system, the apparatus comprising a conversion unit for performing Inverse Fast Fourier Transform (IFFT) on the OFDM symbols after setting a data symbol size of a particular OFDM symbol in each frame to be smaller than a data symbol size of a typical OFDM symbol within the frame, and a transmission unit for inserting cyclic prefixes into data symbols of the particular OFDM symbol and then transmitting the OFDM symbols.

In accordance with another aspect of the present invention, an apparatus is provided for receiving Orthogonal Frequency Division Multiplexing (OFDM) symbols for frequency synchronization in an OFDM system, the apparatus comprising: a correlation unit comprising at least one correlator for receiving a particular OFDM symbol having a data symbol size smaller than a data symbol size of typical OFDM symbols and for calculating respectively correlation coefficients of the particular OFDM symbol based on both a time interval of the corresponding data symbols and a time interval of the typical OFDM symbols, and taking respectively phases of corresponding correlation coefficients calculated from the particular OFDM symbol and estimating a decimal part of a frequency offset; and an estimation unit for estimating a substantially entire frequency offset by determining an integer part of the frequency offset corresponding to the decimal part of the frequency offset and acquiring the frequency synchronization.

BRIEF DESCRIPTION OF THE DRAWINGS

The above and other objects, features and advantages of the present invention will become more apparent from the following detailed description taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Hereinafter, exemplary embodiments of the present invention will be described with reference to the accompanying drawings. In the following description, detailed descriptions of known functions and configurations incorporated herein are omitted for clarity and conciseness.

In contrast with the conventional method which uses two pilot OFDM symbols for the initial frequency synchronization, a principle of embodiments of the present invention lies in that one OFDM symbol in each frame is divided into at least two parts which can be converted by FFTs having sizes of N1 and N2 smaller than N, which is an FFT size of a typical OFDM symbol.

That is, according to embodiments of the present invention, the transmitter arranges the OFDM symbols carrying data such that they have different FFT sizes each frame, and the receiver having received an OFDM symbol, calculates a correlation coefficient between data in the OFDM symbol and the cyclic prefix either with a time interval of N data symbols, or with a time interval of N1 data symbols, or with a time interval of N1 and N2 data symbols. Further, it is possible in accordance with the embodiments of the present invention to acquire the initial frequency synchronization by acquiring the first frequency synchronization by taking a phase for the correlation value exceeding a predetermined threshold value and acquiring the second frequency synchronization by resolving the ambiguity of the frequency offset. Therefore, it is possible in accordance with the embodiments of the present invention to acquire the initial frequency synchronization even without transmitting a particular preamble or pilot OFDM symbol.

In the method according to embodiments of the present invention as described above, the process for acquiring the first frequency synchronization corresponds to a process of determining the decimal part of the frequency offset, and the process for acquiring the second frequency synchronization corresponds to a process of determining the integer part of the frequency offset.

Hereinafter, exemplary embodiments of the present invention provided for initial frequency synchronization will be described with reference to the accompanying drawings.

Figure 1:
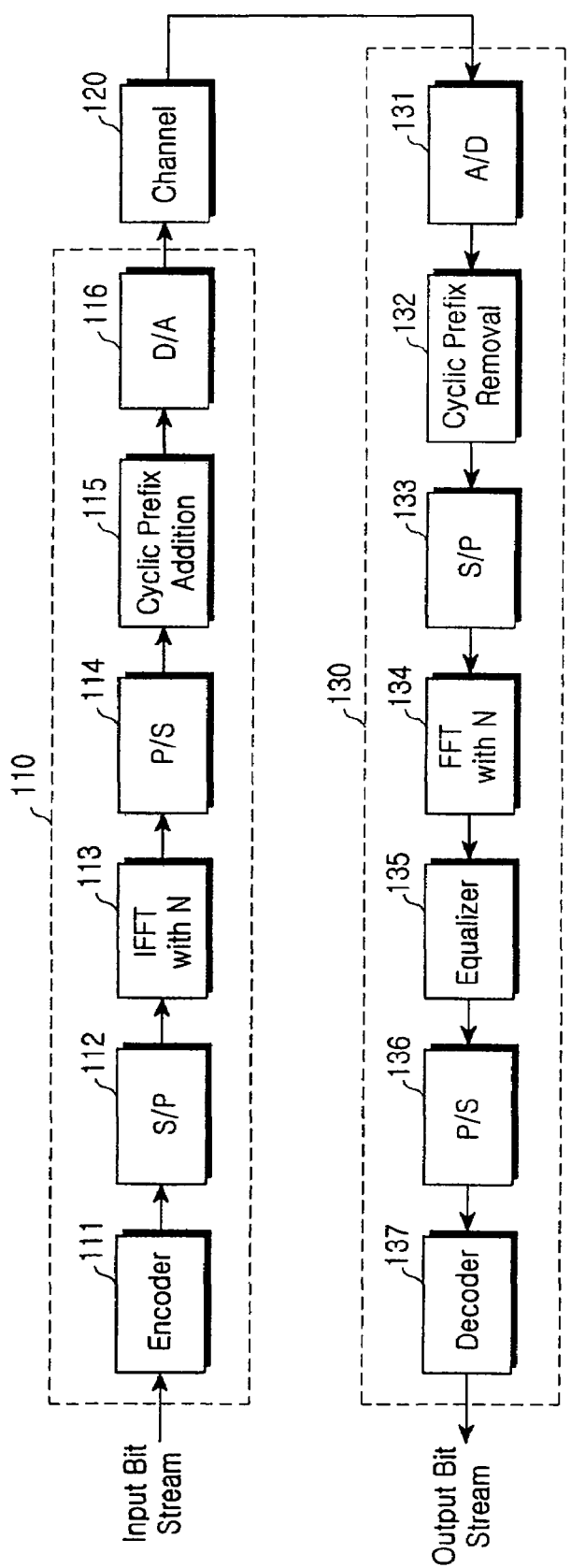
FIG. 1 is a block diagram illustrating the structure of a transmitter and a receiver in a physical layer of a typical OFDM system.
Figure 2:
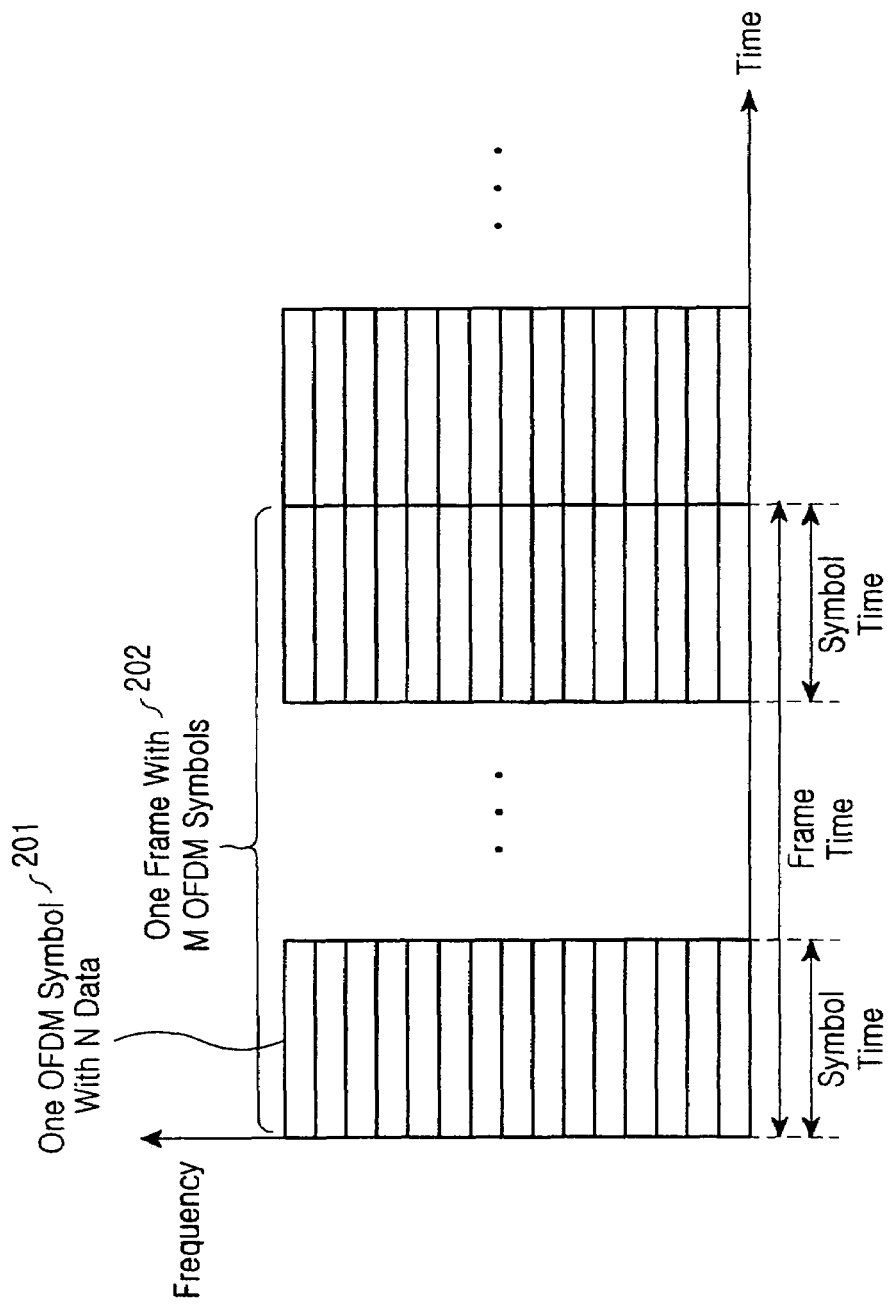
FIG. 2 is a graph illustrating data symbols transmitted in a typical OFDM system, which are illustrated according to frequency and time.
Figure 3:
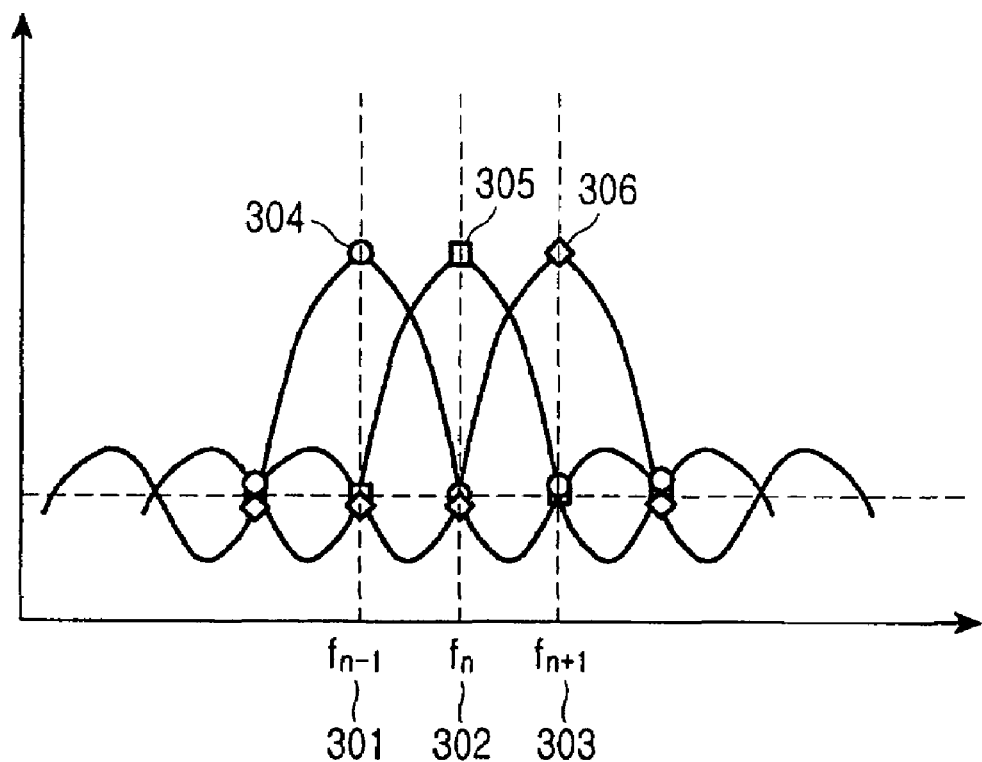
FIG. 3 is a graph illustrating an example of the orthogonality between sub-carriers in the OFDM system.
Figure 4:
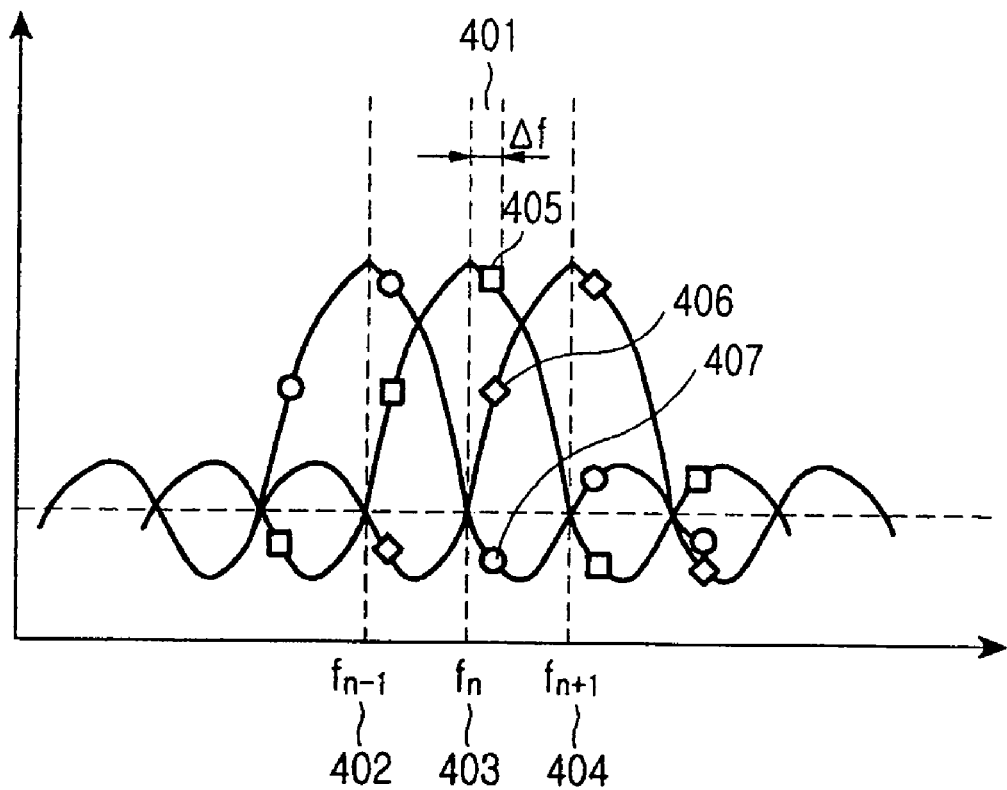
FIG. 4 is a graph illustrating interference between sub-carriers when there are frequency offsets in a typical OFDM system.
Figure 5:
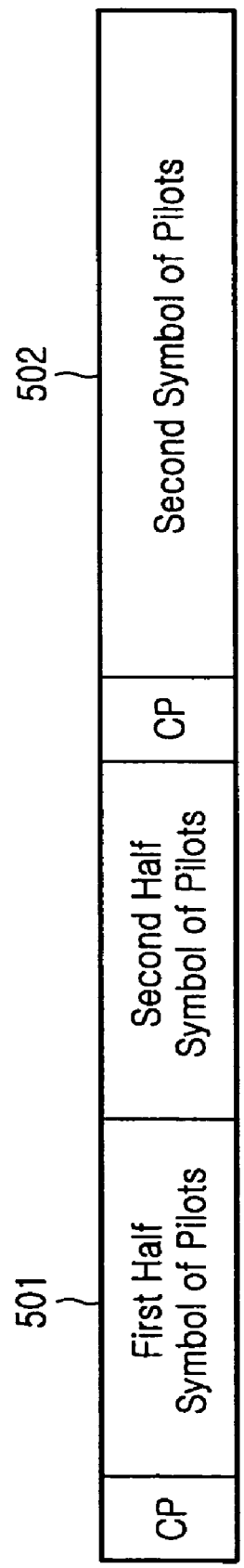
FIG. 5 illustrates an example of a format of pilot OFDM symbols according to a conventional initial frequency synchronization method in an OFDM system.
Figure 6:
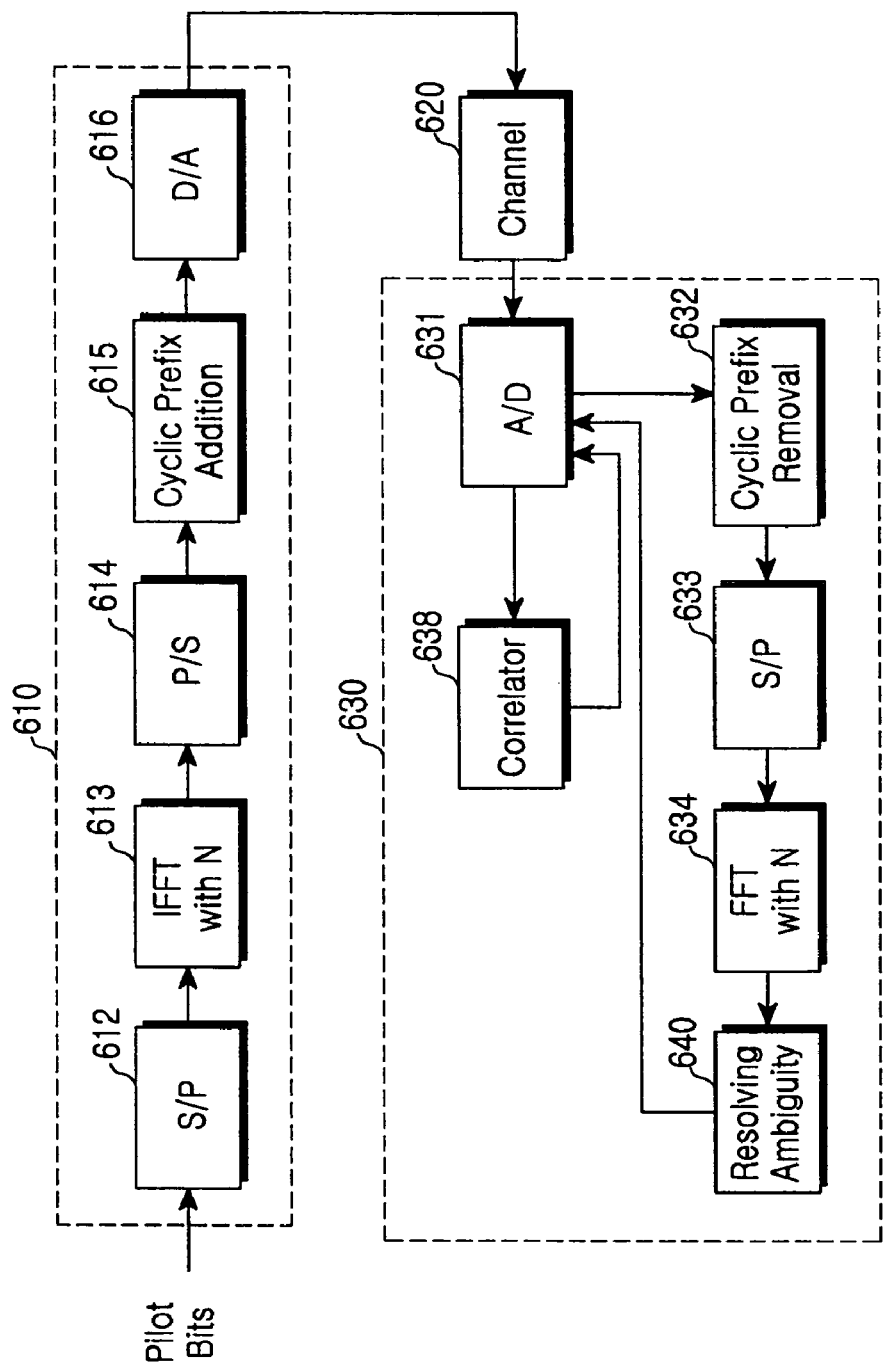
FIG. 6 is a block diagram illustrating a structure of a transmitter and a receiver for initial frequency synchronization in a physical layer of a conventional OFDM system.
Figure 7:
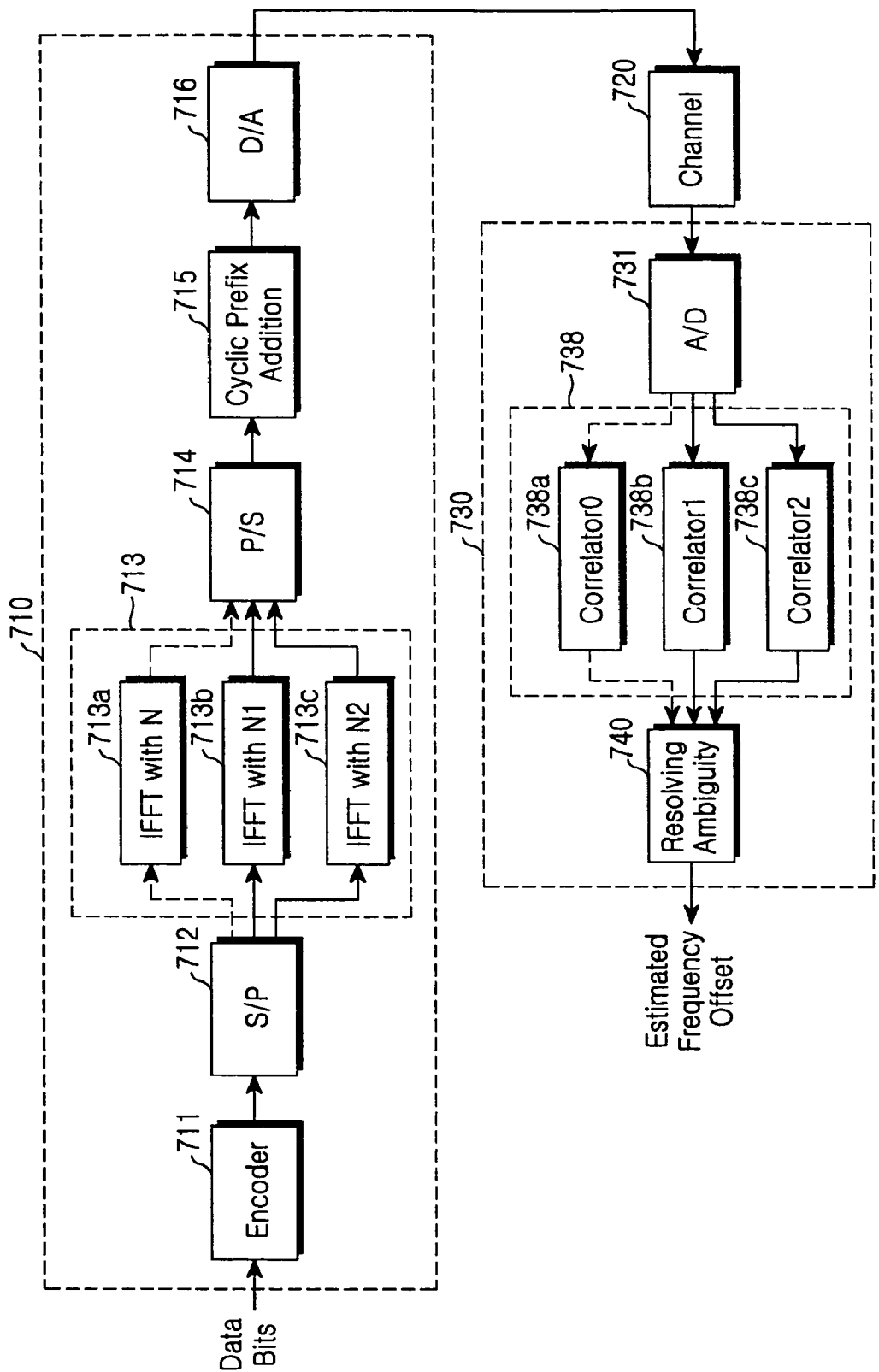
FIG. 7 is a block diagram illustrating a structure of a transmitter and a receiver for initial frequency synchronization in an OFDM system according to an embodiment of the present invention.

FIG. 7 is a block diagram illustrating a structure of a transmitter and a receiver for initial frequency synchronization in an OFDM system according to an embodiment of the present invention. The structure of FIG. 7 comprises a transmitter 710 and a receiver 730.

Referring to FIG. 7, the transmitter 710 comprises an encoder 711, a serial/parallel converter 712, a parallel/serial converter 714, a CP inserter 715, and a digital/analog converter 716. Although a pilot bit is transmitted for frequency synchronization in the conventional method, the transmitter 710 of embodiments of the present invention transmits data bits without transmitting a separate pilot bit. The transmitter 710 further comprises an Inverse Fast Fourier Transform (IFFT) unit 713 that is capable of IFFT-converting data bits and also IFFT-converting typical OFDM symbols having an IFFT size of N into OFDM symbols having a size (e.g. N1 or N2) smaller than N. The serial/parallel converter 712 converts the data bits encoded by the encoder 711 into parallel signals and transfers the converted parallel signals to the IFFT unit 713. The output of the IFFT unit 713 is transferred to the parallel/serial converter 714.

In embodiments of the present invention, the IFFT unit 713 comprises, for example, a plurality of IFFT converters 713a, 713b and 713c having sizes of N, N1 and N2, respectively. The IFFT converter 713a having the size of N performs an N sized IFFT for processing typical OFDM symbols for the input data bits, and the IFFT converter 713b having the size of N1 performs an N1 sized IFFT for processing OFDM symbols having an FFT size smaller than N which are located at each frame. Further, when at least one OFDM symbol located at each frame is divided into two parts respectively having sizes of N1 and N2, the IFFT unit 713 simultaneously performs an N1 sized IFFT and an N2 sized IFFT by means of the IFFT converters 713b and 713c.

Although two cases having N1 and N2 as an FFT size of the OFDM symbol are described in regard to the exemplary embodiment, it is possible for the IFFT unit 713 to have a construction that is capable of processing an OFDM symbol including at least two parts each having a size smaller than N.

The parallel/serial converter 714 converts the IFFT-converted data into a serial data and inputs the serial data to the CP inserter 715. The CP inserter 715 inserts CPs into the input serial data and then inputs the CP inserted data to the digital/analog converter 716, which then converts the data into an analog signal. The converted analog signal is then transmitted to the receiver through the channel 720.

The receiver 730 which receives the signal transmitted through the channel 720 from the transmitter, comprises an analog/digital converter 731 for converting the received signal into a digital signal, a correlation unit 738 for acquiring a first frequency synchronization by receiving the digitalized OFDM symbol and calculating a correlation value between the data in the OFDM symbol and the cyclic prefix, and an ambiguity resolution unit 740 for acquiring a second frequency synchronization by resolving ambiguity of the output correlation value. It should be noted that other general elements of a receiver of an OFDM system such as a CP remover, an FFT converter and so forth are omitted in FIG. 7 for clarity and conciseness.

When the correlation unit 738 receives an OFDM symbol, the correlation unit 738 calculates correlation coefficients between data within the OFDM symbol and the cyclic prefix by using a time interval of an N sized data symbol and a time interval of a data symbol having a size smaller than N, and takes a phase for the correlation coefficient exceeding a predetermined threshold and determines the decimal part of the frequency offset for the phase (that is, the first frequency synchronization).

Referring to FIG. 7, the correlation unit 738 receives the OFDM symbol which has been converted into a digital signal by the analog/digital converter 731. The received OFDM symbol simultaneously passes through the correlator #0 738a for an OFDM symbol having been subjected to an N sized IFFT, the correlator #1 738b for an OFDM symbol having been subjected to an N1 sized IFFT, and the correlator #2 738c for an OFDM symbol having been subjected to an N2 sized IFFT when the symbol has been divided into two parts. The correlators 738a, 738b and 738c calculate the correlation coefficients between data within the OFDM symbol and the cyclic prefix by using data symbol time intervals of N, N1 and N2. Also, the correlators 738a, 738b and 738c check if the calculated correlation coefficients are larger than a predetermined threshold value and takes a phase for the correlation coefficient exceeding the threshold value, thereby estimating the decimal part of the frequency offset.

When the correlation unit 738 has estimated at least one decimal part of the frequency offset, the correlation unit 738 transfers the correlation values to the ambiguity resolution unit 740. The ambiguity resolution unit 740 acquires the second frequency synchronization by determining the integer part of the frequency offset by using the frequency synchronization estimation algorithm of embodiments of the present invention as described below. Therefore, the receiver 730 having acquired both the first and second frequency synchronization by the above-described exemplary embodiment constructions and methods can determine the frequency offset and acquire the initial synchronization even without receiving the pilot OFDM symbol.

Hereinafter, a frequency synchronization estimation algorithm of embodiments of the present invention will be described in greater detail.

According to an exemplary embodiment of the present invention, the initial frequency synchronization is estimated by calculating the correlation coefficient between data in the OFDM symbol and the cyclic prefix at one OFDM symbol within each frame having an FFT size different from that of the typical OFDM symbol. Equation (7) below can be derived from an OFDM symbol having an FFT size of N.

$$\Delta f = \hat{\phi}_0/(2\pi T) + \hat{g}_0/T \tag{7}$$

In equation (7), $\hat{\phi}_0$ denotes the decimal part of the frequency offset of the OFDM symbol having an FFT size of N, and $\hat{g}_0$ denotes the integer part of the frequency offset corresponding to a multiple of the sub-carrier band. Further, the frequency offset for an OFDM symbol having a reduced FFT size of N1 can be estimated by equation (8) below.

$$\Delta f = \hat{\phi}_1/(2\pi T1) + \hat{g}_1/T1 \tag{8}$$

In equation (8), $\hat{\phi}_1$ denotes the decimal part of the frequency offset of the OFDM symbol having an FFT size of N1, $\hat{g}_1$ denotes the integer part of the frequency offset corresponding to a multiple of the sub-carrier band and T1 denotes a time interval corresponding to a data except for the length of the cyclic prefix of the symbol having an FFT size of N1.

In contrast to equation (1) showing the repetition of the pilot data having a half OFDM symbol length, equation (8) shows a frequency offset estimation using a correlation coefficient between an OFDM symbol data of one OFDM symbol length difference and the cyclic prefix. Therefore, the range of the decimal part of the frequency offset is estimated within an absolute value of the half length of the sub-carrier band, and the ambiguity occurs by an integer multiplied by the sub-carrier band instead of by an integer multiplied by twice the sub-carrier band.

When one OFDM symbol of each frame is divided into two FFT parts having sizes of N1 and N2 and the data subjected to the second FFT part having the size of N2 is used, the frequency offset can be estimated by equation (9) below.

$$\Delta f = \hat{\phi}_2/(2\pi T2) + \hat{g}_2/T2 \quad (9)$$

In equation (9), $\hat{\phi}_2$ denotes the decimal part of the frequency offset of the OFDM symbol having an FFT size of N2, $\hat{g}_2$ denotes the integer part of the frequency offset corresponding to a multiple of the sub-carrier band, and T2 denotes a time interval corresponding to data excluding the length of the cyclic prefix of the symbol having an FFT size of N2.

By using equations (7) through (9), it is possible to determine the single frequency offset $\Delta f$ according to selection of N1 or N2 with respect to N.

For the case in which one OFDM symbol within each frame is transmitted after being subjected to an FFT having a size of N1 or after being divided into two parts by FFTs having sizes of N1 and N2 as described above, various examples of transmission of the cyclic prefix and OFDM data according to time and frequency coordinates will be described in detail with reference to FIGS. 8 through 10.

Figure 8:
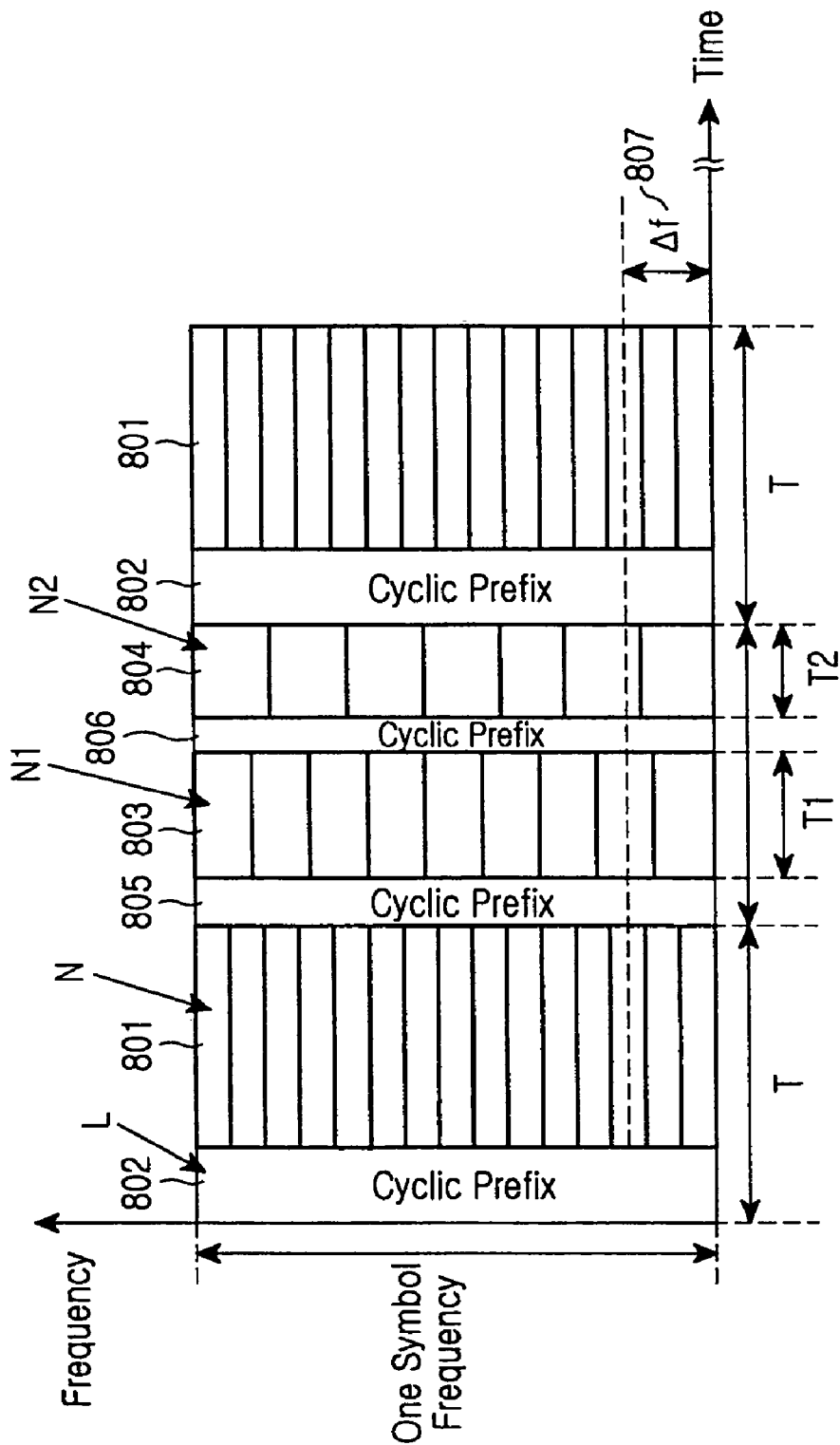
FIG. 8 is a graph illustrating a method for transmission of a cyclic prefix and OFDM data according to an embodiment of the present invention.

FIG. 8 is a graph illustrating a method for transmission of a cyclic prefix and OFDM data according to an embodiment of the present invention.

Referring to FIG. 8, a cyclic prefix 802 repeating the sample at the rear end of an OFDM symbol 801 with a length of L in the time domain, is added to the front end of the OFDM symbol 801 that has been subjected to the N sized FFT conversion and the OFDM symbol 801 is then transmitted. Further, the transmitted OFDM symbol having been subjected to the N1 and N2 sized FFT conversion comprises the FFT part and accompanies an N1 sized FFT part 803 with a corresponding cyclic prefix 805 and an N2 sized FFT part 804 with a corresponding cyclic prefix 806. In this case, if a frequency offset of $\Delta f$ has occurred, the frequency offset has a different decimal part and integer part depending on the size of the FFT conversion.

For example, if it is assumed in this example that N=16, N1=9 and N2=7, then T/T1=1.178 and T/T2=2.286. As noted from Table 1 below, if $\Delta f^*T=2.5$, the decimal part of the frequency offset in the OFDM symbol having an N sized FFT is $1.0\pi$ ($\phi_0=1.0\pi$) and the decimal parts of the frequency offset in the OFDM symbol having N1 and N2 sized FFTs are $1.444\pi$ and $0.428\pi$, respectively (that is, $\phi_1=1.444\pi$ and $\phi_2=0.428\pi$). Therefore, it is theoretically possible to obtain the decimal parts $\phi_0$, $\phi_1$ and $\phi_2$, and the integer parts $g_0$, $g_1$ and $g_2$ of the frequency offset coinciding with $\Delta f$.

TABLE 1

| $\Delta f * T = 2.5$ | | $g_0 = 2$ | $\phi_0 = 1.0\pi$ |
|---|---|---|---|
| Equation (8) | T/T1 = 1.178 | $g_1 = 1$ | $\phi_1 = 1.444\pi$ |
| Equation (9) | T/T2 = 2.286 | $g_2 = 1$ | $\phi_2 = 0.428\pi$ |

Further, the integer parts corresponding to the decimal parts of the frequency offset may be provided in the form of table information at the receiver.

In an actual estimation of the frequency offset, an estimation error may be added to make it difficult to achieve an exact estimation of the frequency offset. The estimation error may be reduced by properly setting up the value N1 or the values N1 and N2. Further, it is possible to obtain a more exact and clearer frequency offset through repetition of the estimation, revision and then estimation of the frequency offset again.

In the OFDM system according to embodiments of the present invention, one OFDM symbol including N number of data samples is transmitted together with L number of cyclic prefixes. In the exemplary embodiment shown in FIG. 8, the cyclic prefixes are arranged at two locations based on the FFT, and the total length of the cyclic prefixes is equal to that in the case of the OFDM symbol having an N sized FFT. However, in this case, the reception performance may be degraded due to the delay length of the multi-path fading.

Figure 9:
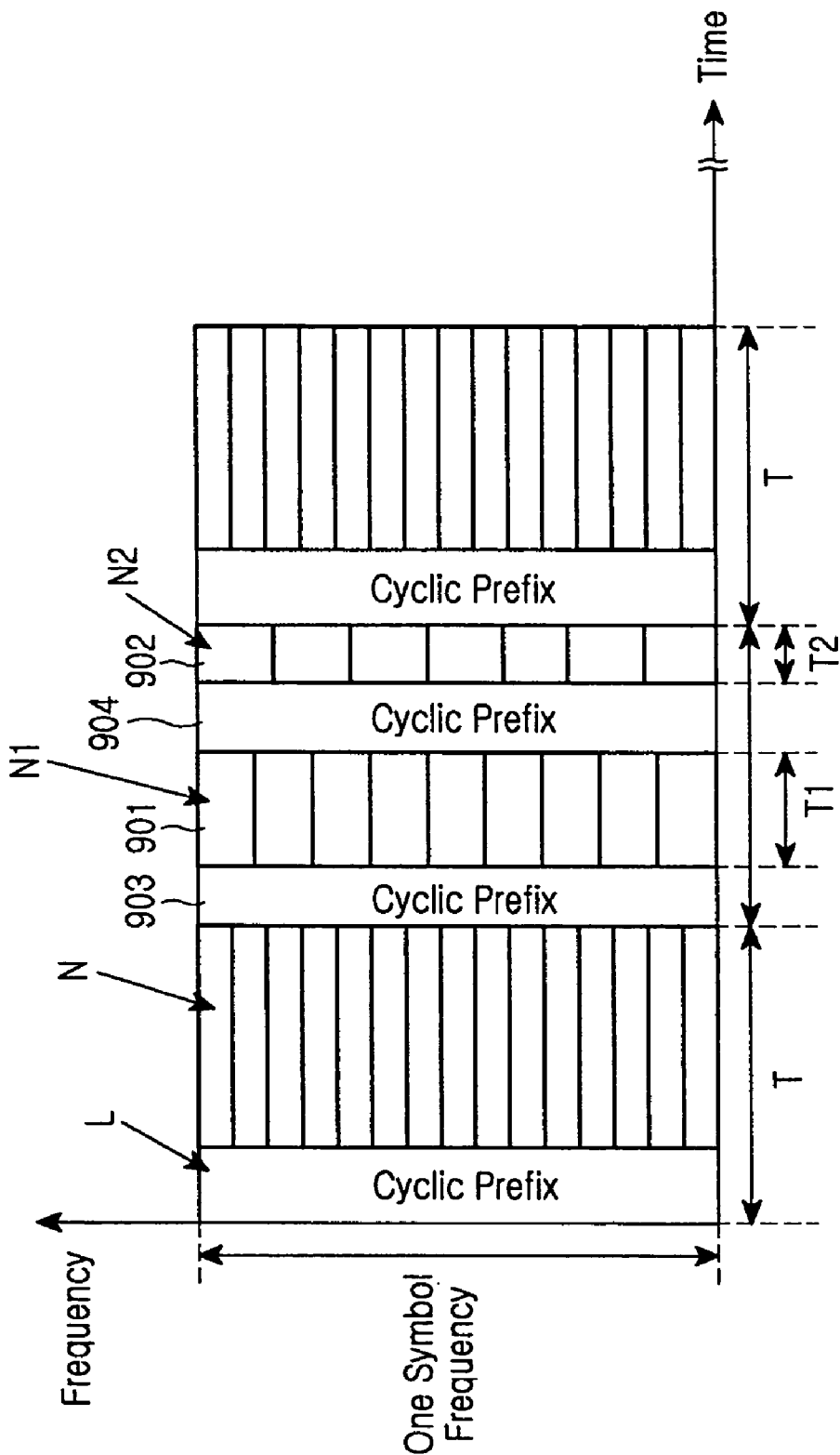
FIG. 9 is a graph illustrating a method for transmission of a cyclic prefix and OFDM data according to another embodiment of the present invention, in which one OFDM symbol in each frame is transmitted after being divided into two FFTs.

FIG. 9 is a graph illustrating a method for transmission of a cyclic prefix and OFDM data according to another embodiment of the present invention, in which one OFDM symbol in each frame is transmitted after being divided into two FFTs.

Referring to FIG. 9, cyclic prefixes 903 and 904 having the same size of L as that of the typical OFDM symbol having an N sized FFT are put in front of the two parts 901 and 902 having sizes of N1 and N2. The sizes N1 and N2 of the two data parts may be reduced in consideration of the size of the cyclic prefixes in order to insert additional cyclic prefixes within a range defined by one OFDM symbol and the number of all samples of corresponding cyclic prefixes.

Figure 10:
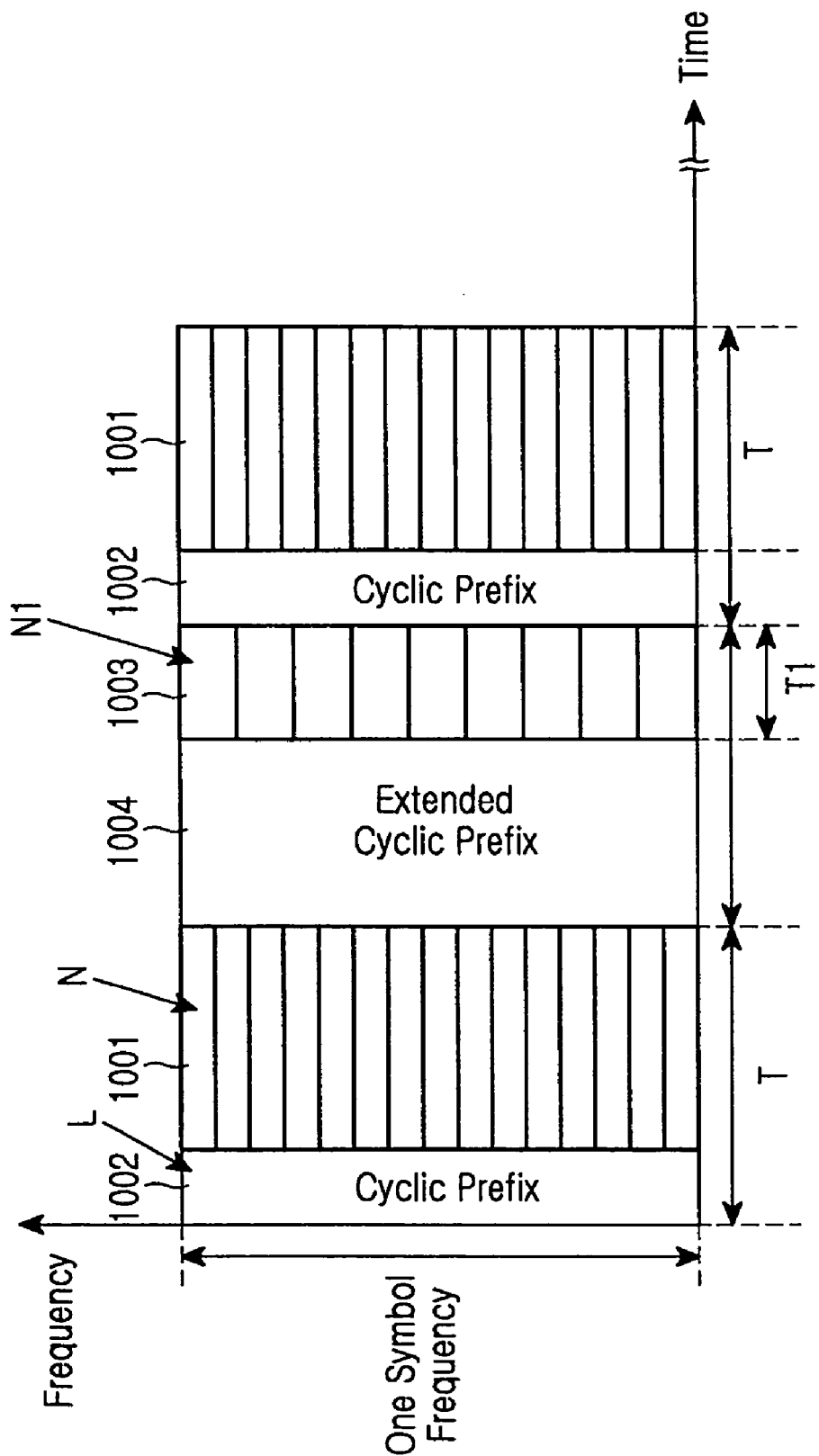
FIG. 10 is a graph illustrating a method for transmission of a cyclic prefix and OFDM data according to another embodiment of the present invention, in which one OFDM symbol in each frame is transmitted in a state of having a size of N1 smaller than N.

FIG. 10 is a graph illustrating a method for transmission of a cyclic prefix and OFDM data according to another embodiment of the present invention, in which one OFDM symbol in each frame is transmitted in a state of having a size of N1 smaller than N.

Referring to FIG. 10, one OFDM symbol 1003 in each frame is subjected to an N1 sized FFT and the other data OFDM symbols 1001 are subjected to an N sized FFT, and they are then transmitted together with cyclic prefixes each having a size of L. For the cyclic prefix 1004 for the OFDM symbol 1003 subjected to the N1 sized FFT, an extended cyclic prefix 1004 may be transmitted because the FFT size has been reduced from N to N1.

As described above, FIGS. 8 through 10 illustrate examples of improvements in the performance of the initial frequency synchronization by using OFDM symbols converted by an FFT with a size smaller than N instead of the OFDM symbols converted by an N sized FFT, by which embodiments of the present invention are not limited.

Hereinafter, an exemplary operation of a transmitter and receiver according to embodiments of the present invention will be described with reference to FIGS. 11 and 12. The following operation is an example of transmission of OFDM symbols having been divided into parts corresponding to N1 and N2 sized FFTs for initial frequency synchronization.

Figure 11:
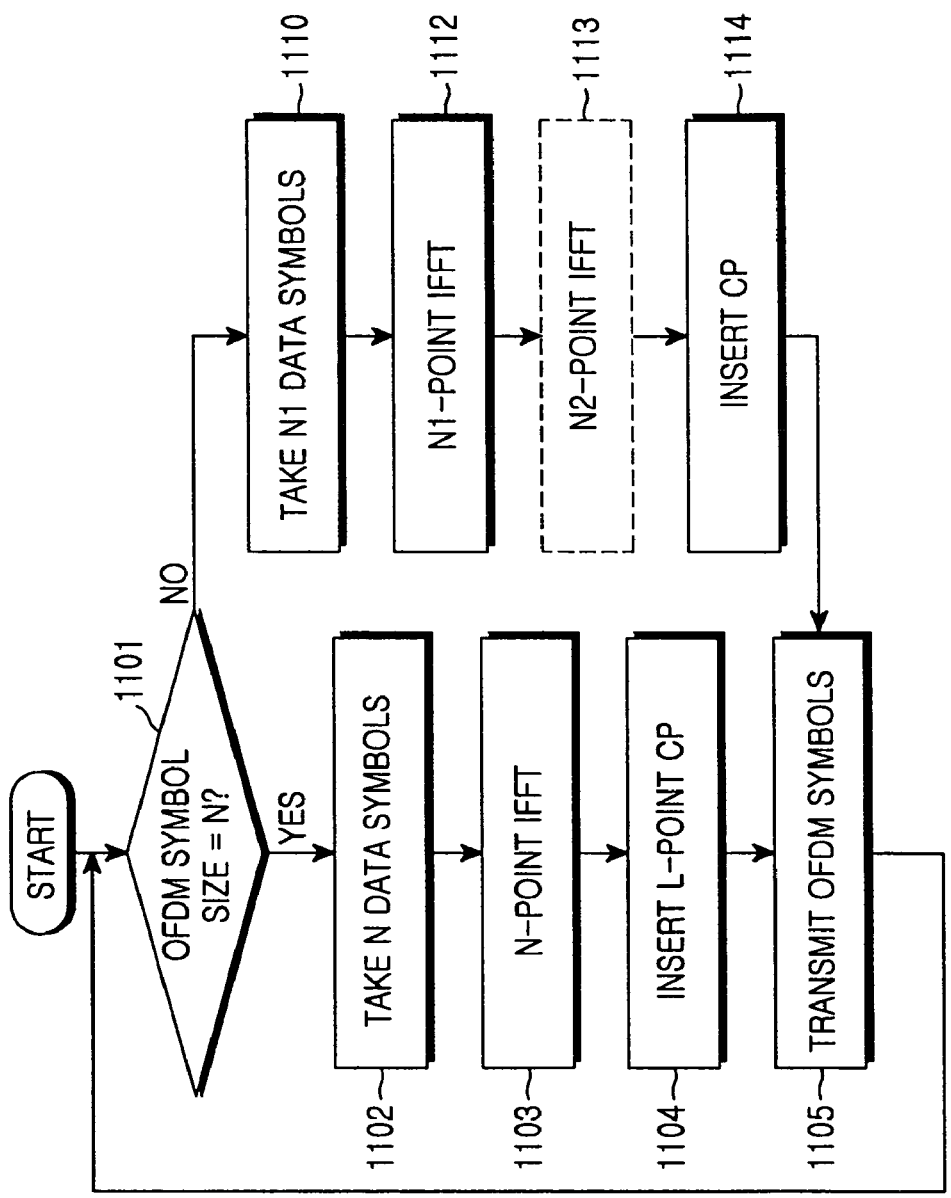
FIG. 11 is a flowchart of an operation of a transmitter in an OFDM system according to an embodiment of the present invention.

FIG. 11 is a flowchart of an operation of a transmitter in an OFDM system according to an embodiment of the present invention.

Referring to FIG. 11, when the data transmission begins, the transmitter determines whether to select an FFT with a size of N or an FFT with a size smaller than N at step 1101. As a result of the determination, when it is necessary to transmit an OFDM symbol corresponding to the N sized FFT, the transmitter takes N number of data symbols at step 1102 and performs N sized IFFT conversion for the data symbols to shift the symbols into the time domain at step 1103. Then, the transmitter inserts L sized cyclic prefixes into the data symbols of the time domain at step 1104, transmits the OFDM symbols at step 1105, and then returns to step 1101.

As a result of the determination in step 1101, when it is necessary to transmit an OFDM symbol corresponding to an FFT having a size smaller than N, the transmitter takes N1 number of or (N1+N2) number of data symbols at step 1110 and performs N1 sized IFFT conversion for the data symbols at step 1112. Then, the transmitter performs N2 sized IFFT conversion for the data symbols at step 1113. Here, step 1113 may be omitted if necessary. When step 1113 is performed, an N2 point IFFT conversion of the data symbols is first performed, and the N OFDM symbols are then divided into N1 symbols and N2 symbols for FFT conversion (wherein each N1 and N2 is smaller than N) as shown in FIGS. 9 and 10. However, in the example shown in FIG. 11, an IFFT is performed only for N1 number of data symbols. Thereafter, the transmitter inserts CPs into the IFFT converted data symbols and outputs the OFDM symbols to be transmitted at step 1114 and then transmits the OFDM symbols having been subjected to an IFFT of a size smaller than N at step 1105.

Hereinafter, an operation of a receiver having received OFDM symbols transmitted from the transmitted operating as described above will be described with reference to FIG. 12.

Figure 12:
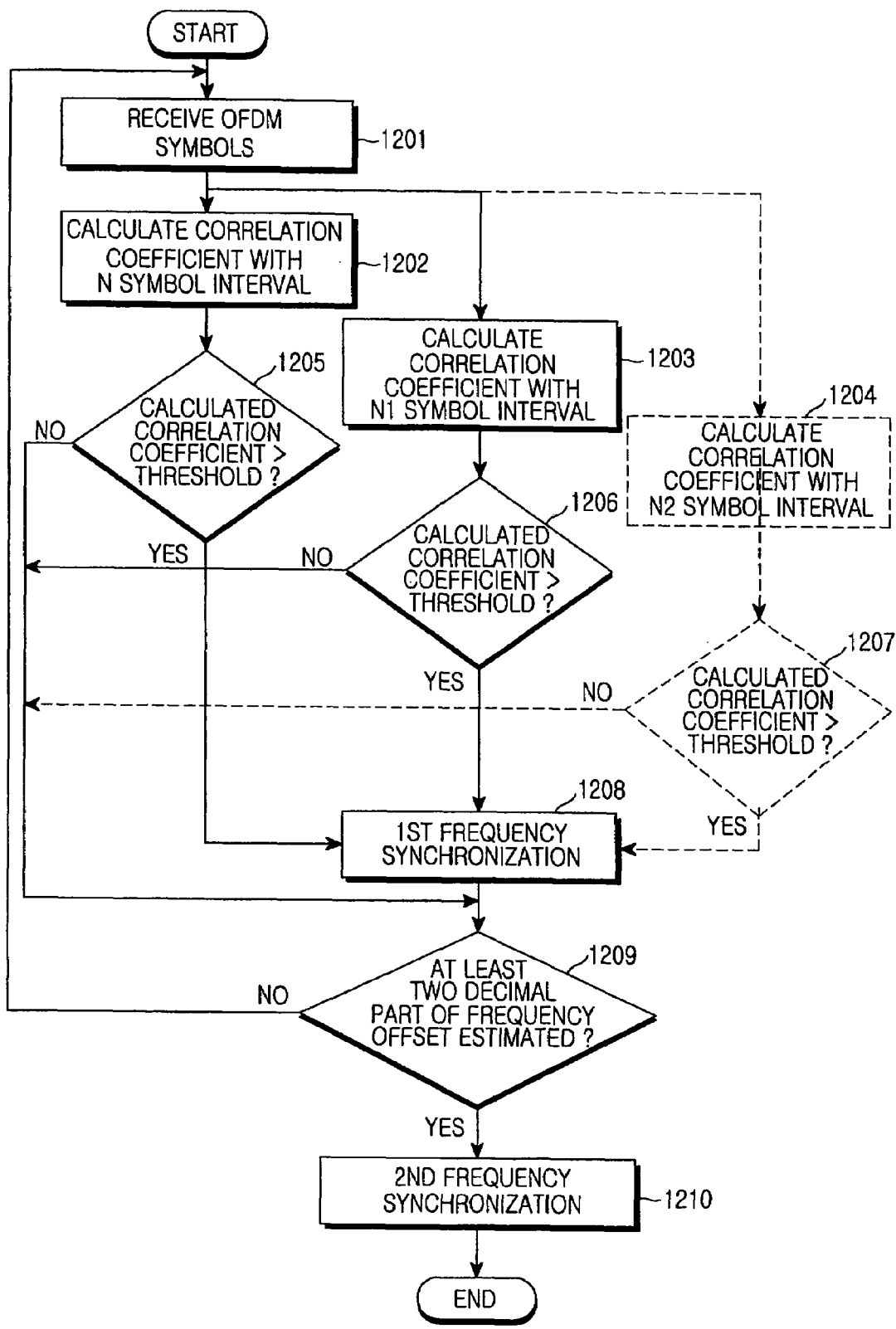
FIG. 12 is a flowchart of an operation of a receiver in an OFDM system according to an embodiment of the present invention.

FIG. 12 is a flowchart of an operation of a receiver in an OFDM system according to an embodiment of the present invention.

In step 1201, the receiver receives and accumulates OFDM symbols including CPs. Whenever it receives each of the OFDM symbols, the receiver renewals an ODFM symbol received newly. Then, the receiver calculates a correlation coefficient between data in the OFDM symbol and a corresponding cyclic prefix with a time interval of N data symbols for each of the received OFDM symbols at step 1202 and calculates a correlation coefficient between data in the OFDM symbol and a corresponding cyclic prefix with a time interval of N1 data symbols. When one OFDM symbol has been divided into two FFT parts, the correlation value is calculated with a time interval of N1 data symbols at step 1203, and also with a time interval of N2 data symbols at step 1204.

Thereafter, in steps 1205 and 1206, the receiver determines if the calculated correlation values for time intervals of the N and N1 data symbols are larger than preset first and second threshold values, respectively. Further, when one OFDM symbol has been divided into two parts for FFT conversion as shown in FIGS. 9 and 10, the receiver determines if the calculated correlation value in relation to the time interval of the N2 data symbols exceeds a preset third threshold value at step 1207.

When each of the calculated correlation value satisfies a condition by the preset threshold values in steps 1205 through 1207, the receiver acquires the first frequency synchronization by taking the phase of the correlation value and estimating the decimal part of the frequency offset at step 1208. When each of the calculated correlation values fails to satisfy the condition by the preset threshold values, the receiver proceeds to step 1209.

When the decimal part of the frequency offset has been estimated, the receiver checks if at least one decimal part of the frequency offset has been estimated through the OFDM symbol including FFT parts of different sizes. When at least one decimal part of the frequency offset has not been estimated, the process repeatedly performs steps 1201 to 1209. When it is determined in step 1209 that at least two decimal part of the frequency offset has been estimated, the receiver acquires the second frequency synchronization by resolving the ambiguity and determining the integer part of the frequency offset in order to estimate the entire frequency offset at step 1210.

The entire frequency offset estimated through the process of FIG. 12 is used to revise the frequency offset. In order to reduce error in the course of the initial frequency synchronization, the estimation of the entire frequency offset can be repeated even after the frequency offset is revised.

As described above, the present invention provides a method and an apparatus for initial frequency synchronization which can reduce the overhead of the system in the process for initial frequency synchronization of an OFDM system, and can acquire initial frequency synchronization without transmitting a pilot OFDM symbol in an OFDM system. Also, the present invention provides a method and an apparatus which can acquire initial frequency synchronization in the time domain by using a cyclic prefix and by transmitting a particular OFDM symbol having a data size smaller than that of a typical OFDM symbol through each frame in an OFDM system.

While the invention has been shown and described with reference to certain exemplary embodiments thereof, it will be understood by those skilled in the art that various changes in form and detail may be made therein without departing from the spirit and scope of the invention as defined by the appended claims.

What is claimed is:

1. A method for frequency synchronization in an Orthogonal Frequency Division Multiplexing (OFDM) system, the method comprising the steps of:

dividing data symbols of a particular OFDM symbol into at least two Fast Fourier Transform (FFT) parts each having cyclic prefixes;

transmitting OFDM symbols including the divided FFT parts such that a data symbol size of a particular OFDM symbol is set to be smaller than a data symbol size of typical OFDM symbols within a frame;

receiving the particular OFDM symbol and calculating respectively correlation coefficients of the particular OFDM symbol based on both a time interval of data symbols of the particular OFDM symbol and a time interval of data symbols of the typical OFDM symbol;

taking respectively phases of corresponding correlation coefficients calculated from the particular OFDM symbol and estimating a decimal part of a frequency offset; and determining an integer part of the frequency offset corresponding to the decimal part of the frequency offset for estimating a substantially entire frequency offset and acquiring the frequency synchronization;

wherein a total size of the cyclic prefixes in each of the FFT parts is larger than the size of the cyclic prefix of the typical OFDM symbol.

2. The method as claimed in claim 1, wherein the decimal part of the frequency offset is estimated when each of the correlation coefficients is larger than a preset threshold value.

3. The method as claimed in claim 1, wherein the correlation coefficient corresponds to a correlation value between a data symbol and a corresponding cyclic prefix in an OFDM symbol.

4. The method as claimed in claim 1, wherein, for the typical OFDM symbol having a data symbol size of N, the frequency offset is estimated by an equation given as, $$\Delta f = \hat{\phi}_0/(2\pi T) + \hat{g}_0/T,$$

wherein $\hat{\phi}_0$ denotes the decimal part of the frequency offset of the corresponding OFDM symbol and $\hat{g}_0$ denotes the integer part of the frequency offset.

5. The method as claimed in claim 4, wherein, when the particular OFDM symbol has a data symbol size of N1, the frequency offset is estimated by an equation given as, $$\Delta f = \hat{\phi}_1/(2\pi T1) + \hat{g}_1/T1,$$

wherein $\hat{\phi}_1$ denotes the decimal part of the frequency offset of the corresponding OFDM symbol, $\hat{g}_1$ denotes the integer part of the frequency offset, and T1 denotes a time interval of the data symbols having a size of N1.

6. The method as claimed in claim 4, wherein, when the particular OFDM symbol is divided into two FFT parts and a second data symbol of the particular OFDM symbol has a size of N2, the frequency offset is estimated by an equation given as, $$\Delta f = \hat{\phi}_2/(2\pi T2) + \hat{g}_2/T2,$$

wherein $\hat{\phi}_2$ denotes the decimal part of the frequency offset of the corresponding OFDM symbol, $\hat{g}_2$ denotes the integer part of the frequency offset, and T2 denotes a time interval of the data symbols having a size of N2.

7. The method as claimed in claim 1, further comprising the step of:
determining the integer part of the frequency offset corresponding to the decimal part of the frequency offset by using a table comprising integer parts calculated in advance for each decimal part.

8. A method for transmitting Orthogonal Frequency Division Multiplexing (OFDM) symbols by a transmitter for frequency synchronization in an OFDM system, the method comprising the steps of:
dividing the data symbols of a particular OFDM symbol into at least two Fast Fourier Transform (FFT) parts and inserting the cyclic prefixes into each of the divided FFT parts;
performing Inverse Fast Fourier Transform (IFFT) on the OFDM symbols after setting a data symbol size of a particular OFDM symbol in each frame to be smaller than a data symbol size of a typical OFDM symbol within the frame, the particular OFDM symbol being used for frequency synchronization; and
inserting cyclic prefixes into data symbols of the particular OFDM symbol and then transmitting the OFDM symbols;
wherein a total size of the cyclic prefixes inserted in each of the divided FFT parts is larger than the size of the cyclic prefix of the typical OFDM symbol.

9. A method for receiving Orthogonal Frequency Division Multiplexing (OFDM) symbols by a receiver for frequency synchronization in an OFDM system, the method comprising the steps of:
receiving a particular OFDM symbol having a data symbol size smaller than a data symbol size of typical OFDM symbols;
dividing the data symbols of the particular OFDM symbol into at least two Fast Fourier Transform (FFT) parts each having cyclic prefixes and calculating respectively correlation coefficients of the particular OFDM symbol based on both a time interval of data symbols of the particular OFDM symbol and a time interval of the typical OFDM symbols;
taking respectively phases of corresponding correlation coefficients calculated from the particular OFDM symbol and estimating a decimal part of a frequency offset; and determining an integer part of the frequency offset corresponding to the decimal part of the frequency offset for estimating a substantially entire frequency offset and acquiring the frequency synchronization;
wherein a total size of the cyclic prefixes in each of the FFT parts is larger than the size of the cyclic prefix of the typical OFDM symbol.

10. The method as claimed in claim 9, wherein the decimal part of the frequency offset is estimated when each of the correlation coefficients is larger than a preset threshold value.

11. The method as claimed in claim 9, wherein the correlation coefficient corresponds to a correlation value between a data symbol and a corresponding cyclic prefix in an OFDM symbol.

12. An Orthogonal Frequency Division Multiplexing (OFDM) system for frequency synchronization for communication, the system comprising:
a conversion unit for dividing the data symbols of a particular OFDM symbol into at least two Fast Fourier Transform (FFT) parts each having cyclic prefixes and for performing Inverse Fast Fourier Transform (IFFT) on the OFDM symbols after setting a data symbol size of the particular OFDM symbol in each frame to be smaller than a data symbol size of a typical OFDM symbol within the frame;
a transmitter for transmitting the particular OFDM symbol including the FFT parts and cyclic prefixes; and
a receiver for receiving the particular OFDM symbol and calculating respectively correlation coefficients of the particular OFDM symbol both a time interval of data symbols of the particular OFDM symbol and a time interval of data symbols of the typical OFDM symbol, taking respectively phases of corresponding correlation coefficients calculated from the particular OFDM symbol and estimating a decimal part of a frequency offset, and determining an integer part of the frequency offset corresponding to the decimal part of the frequency offset for estimating a substantially entire frequency offset and acquiring the frequency synchronization;
wherein a total size of the cyclic prefixes in each of the FFT parts is larger than the size of the cyclic prefix of the typical OFDM symbol.

13. The system as claimed in claim 12, wherein the receiver estimates the decimal part of the frequency offset when each of the correlation coefficients is larger than a preset threshold value.

14. An apparatus for transmitting Orthogonal Frequency Division Multiplexing (OFDM) symbols for frequency synchronization in an OFDM system, the apparatus comprising:
a conversion unit for dividing the data symbols of a particular OFDM symbol into at least two Fast Fourier Transform (FFT) parts and for performing Inverse Fast Fourier Transform (IFFT) on the OFDM symbols after setting a data symbol size of a particular OFDM symbol in each frame to be smaller than a data symbol size of a typical OFDM symbol within the frame, the particular OFDM symbol being used for frequency synchronization; and
a transmission unit for inserting cyclic prefixes into each of the divided FFT parts data symbols of the particular OFDM symbol and then transmitting the OFDM symbols;
wherein the transmission unit is configured to insert the cyclic prefixes in each of the divided FFT parts wherein a total size of the cyclic prefixes to be larger than the size of the cyclic prefix of the typical OFDM symbol.

15. An apparatus for receiving Orthogonal Frequency Division Multiplexing (OFDM) symbols for frequency synchronization in an OFDM system, the apparatus comprising:
- a correlation unit comprising at least one correlator for receiving a particular OFDM symbol having a data symbol size smaller than a data symbol size of typical OFDM symbols and for dividing the data symbols of the particular OFDM symbol into at least two Fast Fourier Transform (FFT) parts each having cyclic prefixes and for calculating respectively correlation coefficients of the particular OFDM symbol based on both a time interval of data symbols of the particular OFDM symbol and a time interval of the typical OFDM symbols according to the division of the data symbols of the particular OFDM symbol, and taking respectively phases of corresponding correlation coefficients calculated from the particular OFDM symbol and estimating a decimal part of a frequency offset; and
- an estimation unit for estimating a substantially entire frequency offset by determining an integer part of the frequency offset corresponding to the decimal part of the frequency offset and acquiring the frequency synchronization;
- wherein a total size of the cyclic prefixes in each of the FFT parts is larger than the size of the cyclic prefix of the typical OFDM symbol.

16. The apparatus as claimed in claim 15, wherein the correlation unit estimates the decimal part of the frequency offset when each of the correlation coefficients is larger than a preset threshold value.

17. The apparatus as claimed in claim 15, wherein the estimation unit is configured to previously store a table comprising integer parts corresponding to the decimal part of the frequency offset.

* * * * *

UNITED STATES PATENT AND TRADEMARK OFFICE
CERTIFICATE OF CORRECTION

PATENT NO.       : 7,596,181 B2
APPLICATION NO.  : 11/227325
DATED            : September 29, 2009
INVENTOR(S)      : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Fourteenth Day of December, 2010

David J. Kappos
*Director of the United States Patent and Trademark Office*